United States Patent
Langhammer

[11] 3,919,454
[45] Nov. 11, 1975

[54] MELTING ARRANGEMENT, PARTICULARLY FOR USE IN THE CONTINUOUS PRODUCTION OF STEEL

[75] Inventor: Hans Jürgen Langhammer, Bremen-Platjenwerbe, Germany

[73] Assignee: Klockner-Werke AG, Duisburg, Germany

[22] Filed: Aug. 26, 1974

[21] Appl. No.: 500,661

[30] Foreign Application Priority Data
Aug. 25, 1973   Germany............... 2342959

[52] U.S. Cl. ............................................. 13/9
[51] Int. Cl.² .................................... H05B 7/10
[58] Field of Search............................. 13/2, 9, 33

[56] References Cited
UNITED STATES PATENTS

| | | | |
|---|---|---|---|
| 2,794,843 | 6/1957 | Sem et al. | 13/33 |
| 3,180,916 | 4/1965 | Menegoz et al. | 13/9 |
| 3,665,085 | 5/1972 | Dumont-Fillon et al. | 13/9 |
| 3,775,544 | 11/1973 | Geck et al. | 13/2 |

Primary Examiner—R. N. Envall, Jr.
Attorney, Agent, or Firm—Michael S. Striker

[57] ABSTRACT

An arrangement which is particularly well-suited for the continuous production of steel from ore, pellets, sinter or the like has a vertically arranged melting chamber into which a charge may be admitted so as to form a column of the charge therein. The chamber may have a constant cross-section or may widen slightly in downward direction. A set of electrodes is provided for melting the leading end of the column of charge and the electrodes are mounted at the lower end of a support which extends through the column of charge. The ends of the electrodes are located at a predetermined distance above the bottom of the chamber and, hence, are located within the column of charge. When an arc is struck between the ends of the electrodes and the column of charge, the leading end of the column melts with the concomitant formation of a melting cavity in the leading end. The distance between the ends of the electrodes and the bottom of the chamber is selected in such a manner that the melting cavity is of part-spherical configuration. The inner surface of the melting cavity is an isothermal surface and the bottom of the chamber is configurated in correspondence with this surface. The arrangement provides for improved energy utilization and for better protection of the lining of the melting chamber against the effects of may in electric arc. When melting a in charge which must be reduced prior to melting, a reducing gas may be admitted into an upper region of the melting chamber. The reducing gas in part be admitted through the wall of the melting chamber and may be part be admitted through the support for the electrodes.

16 Claims, 2 Drawing Figures

U.S. Patent    Nov. 11, 1975    3,919,454
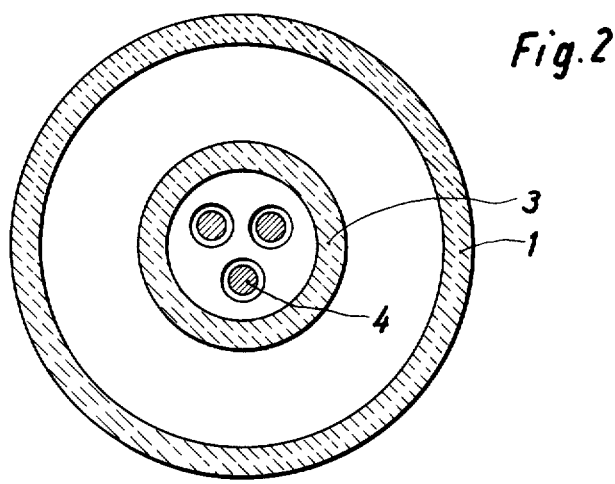
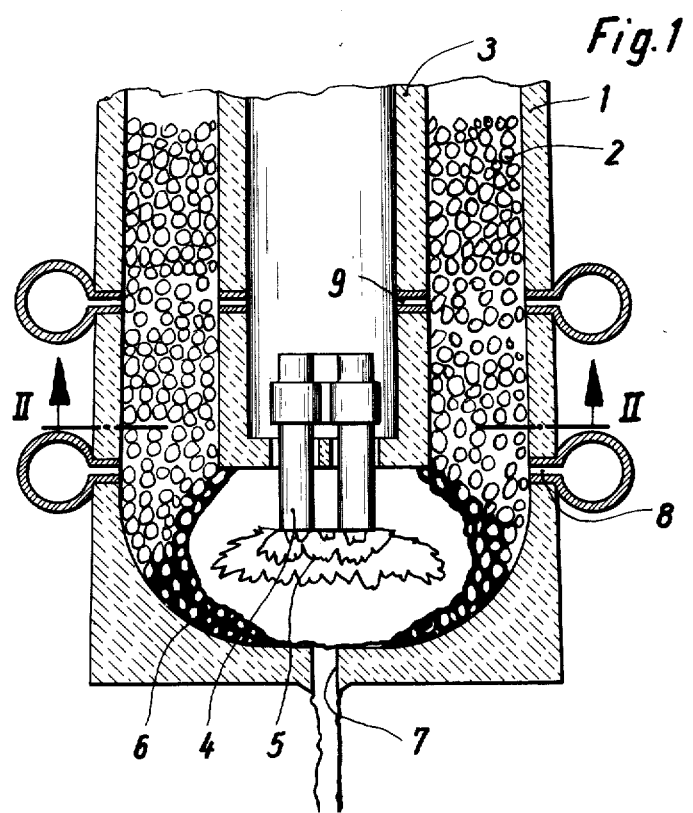

MELTING ARRANGEMENT, PARTICULARLY FOR USE IN THE CONTINUOUS PRODUCTION OF STEEL

BACKGROUND OF THE INVENTION

The invention relates generally to the melting of charges. Of particular interest to the invention is the melting of charges for the production of steel.

A process for the continuous production of steel from ore, pellets, sinter or the like is known. This process may be carried out in a shaft furnace having a constant cross-section or which widens slightly in downward direction. The charge is admitted into the furnace so as to form a charge column therein. An electrode extends into the furnace through the bottom thereof so that an electric arc for melting the charge may be directed against the column from below the latter. As the bottom of the column melts, the column continuously descends in the furnace under the influence of its own weight.

A reducing gas is admitted into the furnace in order to effect reduction of the charge prior to melting. In this manner, substances such as ore contained in the charge are converted to sponge iron. Part of the reducing gas is admitted into the column peripherally thereof whereas part of the reducing gas is admitted directly into the melting cavity which forms at the bottom of the column by virtue of the action of the arc. The latter part of the reducing gas is additionally heated by the electric arc. In this process, the alloying additions required for the final desired steel composition may be introduced into the furnace together with the remainder of the charge and these alloying additions may, in part, be introduced in the form of oxides.

A process of this type enables the sponge iron which is produced in conventional manner in a shaft furnace to be melted in the same chamber wherein the conversion from ore to sponge iron is effected and to be withdrawn from the chamber in the form of steel. In this manner, a two-stage operation, namely, an operation involving conversion of ore to sponge iron in a first apparatus and conversion of sponge iron to steel in a second apparatus, is avoided while, simultaneously, the melting operation may proceed continuously. Moreover, the cooling of the sponge iron from the temperature of the ore conversion stage, which normally occurs in a two-stage operation, and the subsequent re-heating of the sponge iron to the melting temperature may also be avoided. In addition, the problem of re-oxidation of the sponge iron, which problem arises due to the porosity and the attendant large surface area of the sponge iron, may be avoided since the sponge iron is melted under reducing conditions immediately following the reduction of the ore to sponge iron.

While the process itself is basically satisfactory, improvements are desirable in the known arrangements which are used for carrying out the process. Thus, the known arrangements do not permit as complete an energy utilization to be achieved as might be desirable nor are the furnace linings protected from the action of the electric arc as well as would be desirable. In addition, improvements would be desirable in the degree of penetration of the charge column by the reducing gases.

SUMMARY OF THE INVENTION

Accordingly, it is a general object of the invention to provide a novel arrangement for melting charges.

Another object of the invention is to provide an arrangement for melting charges which enables a more efficient energy utilization than heretofore to be realized.

A further object of the invention is to provide an arrangement for melting charges which enables greater protection for the lining of the melting chamber to be achieved than was possible until now.

An additional object of the invention is to provide an arrangement for melting charges which enables a better penetration of a column of charge by gases to be achieved than was possible heretofore.

A concomitant object of the invention is to provide an arrangement for melting charges which may be used for the continuous production of steel from ore, pellets, sinter or the like and which enables a better energy utilization, a better penetration of a column of charge by gases and greater protection for the heat-resistant or fire-resistant material of the melting chamber to be achieved than was possible until now.

These objects as well as others which will become apparent hereafter are achieved by the invention according to one feature of which there is provided an arrangement for melting charges including means defining a substantially vertically oriented melting chamber adapted to accommodate a column of charge. The arrangement further comprises electrode means for melting the leading end of the column and the electrode means has an arc generating end adapted to be downwardly directed and located within the column during melting of the leading end.

Of particular interest to the invention is an arrangement which may be used for carrying out a process for the continuous production of steel from ore, pellets, sinter or the like. Thus, although the principles of the invention may be applicable to arrangements for use in other processes also, the invention will herein be described primarily with reference to the production of steel.

The melting chamber, or at least the major part thereof, may be of substantially constant cross-section or may widen somewhat in downward direction thereof, one of these constructions being preferred in accordance with the invention. The melting chamber may be in the form of a shaft furnace.

Reduction of the charge may be effected in the melting chamber and this may be accomplished by using a suitable reducing gas which is admitted into the melting chamber. Thus, if the charge includes ore such as iron ore, for instance, this may be converted into sponge iron in the melting chamber. It is favorable for reduction of the charge to be effected prior to melting of the same.

The electrode means may include a plurality of electrodes and the electric arc generated by the electrodes may impinge the column of charge from below the latter, that is, at a location of the column above which the major part of the charge is located. Preferably, the arc is substantially centrally positioned with respect to the cross-section of the column or the melting chamber and it is further favorable when the arc, or at least the heating effect thereof, extends across the major part of the cross-section of the column. The arc may also serve to superheat the molten material produced by melting of the charge.

In accordance with a particularly advantageous embodiment of the invention, a support member or guide member is provided for the electrodes. This support member may extend through the column of charge during the melting operation. The electrodes may be mounted at the lower end section of the support member, that is, at the end section of the latter which is located in the region of the leading end of the column.

The action of the electric arc generated by the electrodes may cause the formation of a melting cavity in the leading end of the column. Where reduction of the charge is to be effected, part of the reducing gas which may be used for the reduction may be admitted directly into this melting cavity thereby being subjected to additional heating by means of the arc. Another part of the reducing gas may be admitted into the melting chamber peripherally of the column. As melting of the leading end progresses, the column may continuously descend in the melting chamber under the action of its own weight, that is, fresh charge continuously moves downwardly in the melting chamber under the influence of gravity to become exposed to the action of the electric arc. Where the charge includes ore, for example, and is subjected to reduction, the charge may be in the form of sponge iron upon reaching the region of the electrodes.

In accordance with a particularly favorable embodiment of the invention, the electrodes are maintained at such a distance above the bottom of the melting chamber that the melting cavity formed in the leading end of the column is of approximately spherical or part-spherical configuration. By virtue of the approximately spherical or part-spherical melting cavity, there is obtained in the column of charge, which charge may be in the form of sponge iron particles in the region of the electrodes, an approximately spherical or part-spherical isothermal surface, that is, there is obtained a condition wherein the progression of melting is along an approximately spherical or part-spherical isothermal surface. This is particularly favorable as regards the energy utilization. Moreover, since the sponge iron particles of the charge column may extend to approximately the vicinity of the outlet for the molten material provided at the bottom of the melting chamber, the heat-resistant or fire-resistant material with which the interior of the melting chamber may be lined is practically everywhere very well protected by the charge column. In the region of the outlet, the heat-resistant or fire-resistant material is, in any event, contacted by the molten material produced by the melting operation so that a direct inpingement of this material by the electric arc generated by the electrodes may be prevented in any case.

As already mentioned, reducing gas may be admitted into the melting chamber so as to effect reduction of the charge and this reduction may be a direct reduction. Since it is preferable for reduction of the charge to occur prior to melting of the charge, the reduction may take place in an upper region of the melting chamber while melting may take place in a lower region of the melting chamber. In order to permit introduction of part of the reducing gas peripherally of the column, openings or passages may be provided in the wall of the melting chamber for the admission of reducing gas.

Advantageously, the support or guide member at the lower portion of which the electrodes are mounted is also provided with openings or passages for the purpose of introduction of reducing gas into the direct reduction stage or upper region of the melting chamber. In this manner, there may be obtained a particularly good penetration of the charge column by the gas since penetration of the gas into the column may occur from both exteriorly and interiorly of the column. This is in addition to the already improved penetration which results by virtue of the reduction in cross-section of the charge column due to the presence of the support or guide member which may extend through the column during melting. It is further possible to introduce reducing gas into the melting chamber through the slits or passages defined between the support member and the electrodes so as to enable this reducing gas to undergo additional heating in the region of the electric arc.

As pointed out earlier, it is of particular advantage when a spherical or part-spherical isothermal surface is formed in the column or the leading end thereof. In this connection, it is further advantageous when the bottom portion of the melting chamber is configurated approximately in correspondence with the isothermal surface formed in the column of charge, that is, when the bottom portion of the melting chamber has an approximately hemispherical configuration in the event that the melting cavity has a spherical or part-spherical isothermal surface. This enables a smooth or unhindered descent of the charge column in the melting chamber to be achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic representation in cross-section of a lower part of an arrangement according to the invention; and FIG. 2 is a view in the direction of the arrows II—II of FIG. 1.

DESCRIPTION OF THE PREFERRED EMBODIMENTS

Referring now to FIGS. 1 and 2, it may be seen that there is illustrated a melting apparatus which may be in the form of a shaft furnace. The arrangement in accordance with the invention includes a wall 1 which defines a melting chamber and the inner surface of the wall 1 may be lined with a heat-resistant or fire-resistant material. It is pointed out here that, for the purpose of most clearly illustrating the important features of the invention, only a lower part of the melting chamber has been shown in FIG. 1. Although the details of the uppermost part of the melting chamber are known in the art, it is noted, for the sake of completeness, that the melting chamber may have an upper open end through which a charge may be admitted into the melting chamber. A suitable charging device for regulating the input of charge into the melting chamber may be provided in the region of the upper open end of the melting chamber. In addition, an exhaust conduit for the withdrawal of exhaust gases from the melting chamber may be provided and such an exhaust conduit may communicate with the melting chamber below the upper open end thereof through the wall 1. In order to facilitate evacuation of the exhaust gases from the melting chamber, a suitable source of suction such as, for instance, an exhaust fan, may also be provided.

A charge such as one containing ore, pellets, sinter or the like, for example, is admitted into the upper portion of the melting chamber. The charge forms a column 2 in the melting chamber. As best seen in FIG. 1, a support or guide member 3 extends through the column 2 and the support member 3 may extend into the melting chamber through an upper open end thereof, for instance. The support member 3 may be adjustable so that it can be moved up and down in the melting chamber. The support member 3 is positioned in such a manner that the lower end section thereof is located in the vicinity of the leading or lower end of the column 2.

A plurality of electrodes 4 is mounted at the lower end section of the support member 3. Although three of the electrodes 4 are shown in the present embodiment, it will be appreciated that more or less than this number of electrodes may be provided. It is preferable for the electrodes 4 to be centered with respect to the cross-section of the melting chamber and, hence, with respect to the cross-section of the column 2, so that the electric arc generated thereby may be likewise centered. It is noted here that, for the sake of clarity, the mounting means for mounting the electrodes 4 on the support member 3 has not been illustrated. Moreover, while it will be appreciated that the electrodes 4 are connected to a suitable power supply, neither such power supply nor the connecting means connecting the latter with the electrodes 4 have been shown here so as not to obscure the drawing with details which might prevent a clear understanding of the invention.

In operation, an electric arc 5 is struck between the downwardly facing ends of the electrodes 4 and the charge of the column 2. As will be clear from FIG. 1, the ends of the electrodes 4 at which the arc 5 is generated are located within the column 2 or within the leading end thereof. Due to the action of the arc 5, the charge column 2 is melted from below, that is, the leading end of the column 2 is subjected to melting by the action of the arc 5. The molten material produced by the melting operation may flow out of the melting chamber through an outlet opening 7 provided for this purpose in the bottom of the melting chamber. A non-illustrated receiving vessel may be provided below the outlet 7 for receiving the molten material which continuously flows out of the melting chamber. Advantageously, the arc 5, or the heating action thereof, extends across the major part of the cross-section of the column 2. In addition to causing melting of the leading end of the column 2, the arc 5 may also superheat the molten material produced by the melting operation.

The heating action of the arc 5, which extends for a certain distance in all directions, causes the formation of a melting cavity in the leading end of the column 2 as may be best seen in FIG. 1. It is noteworthy here that the more heavily blackened portion of the leading end of the column 2 represents a region of the leading end where the individual particles of the charge have welded to one another as a result of the high temperature. This welding of the individual particles of the charge to one another results in the formation of a support structure or frame which possesses sufficient strength to support the portion of the charge located above the leading end of the column 2.

As melting of the leading end progresses, the column 2 descends in the melting chamber, that is, fresh charge moves downwardly in the melting chamber to become exposed to the action of the arc 5. As the charge moves downwardly in the melting chamber it may be subjected to reduction. Thus, if the charge contains ore, pellets, sinter or the like, a direct reduction and a concomitant conversion to sponge iron may occur. While melting of the charge takes place in a lower region of the melting chamber as will be clear from the description so far, direct reduction of the charge may be effected in an upper region of the melting chamber, that is, in a region of the melting chamber located above that in which melting occurs. The melting chamber may thus include a melting stage and a direct reduction stage with the direct reduction stage being located above the melting stage so that the charge moving downwardlly in the melting chamber may be in the form of sponge iron upon reaching the level of the melting stage or of the leading end of the column 2.

Reduction of the charge may be effected by admitting reducing gas into the melting chamber. For this purpose, openings or annular slots 8 may be provided at the circumference of the melting chamber, that is, in the wall 1 thereof, in order to permit the introduction of reducing gas for the direct reduction stage into the melting chamber. It may be seen that the reducing gas admitted into the melting chamber via the openings 8 is introduced into the column 2 peripherally thereof or from exteriorly thereof.

As also illustrated in FIGS. 1 and 2, the electrodes 4 may extend through the support member 3 with clearance, that is, the electrodes 4 may be separated from the support member 3 by gaps or slot which are preferably of ring-shaped or annular configuration. Through these gaps, reducing gas may be admitted into the melting cavity formed in the leading end of the column 2. Thus, reducing gas may be blown through the support member 3 and, from the latter, into the melting cavity via the gaps between the same and the electrodes 4. This reducing gas is heated by the arc 5 and may then be used for the reduction in the direct reduction stage overlying the melting stage. Moreover, in correspondence to the openings 8 provided in the wall 1 of th melting chamber, the support member 3 may be provided with openings or passages 9 for the introduction of reducing gas into the direct reduction stage. The passages 9 are preferably so arranged that they are located in the region of the direct reduction stage during the melting operation. The passages 9 enable reducing gas conveyed through the support member 3 to be blown into the melting chamber and it may be seen that such reducing gas is introduced into the column 2 from interiorly thereof. The presence of the passages 9 permits the penetration of the column 2 by gas to be increased.

The charge material, which may be in the form of pre-reduced sponge iron at the leading end of the column 2, descends along the bottom portion 6 of the melting chamber to the vicinity of the outlet 7 provided for the molten material. At the same time, the melting cavity is formed in the leading end of the column 2 and this melting cavity preferably forms in the middle of the leading end. In accordance with the invention, the electrodes 4 are advantageously positioned at such a distance above the bottom of the melting chamber that the melting cavity is of approximately spherical or part-spherical configuration. In this manner, there may be obtained in the leading end of the column 2 an approximately spherical or part-spherical isothermal surface or, in other words, a condition wherein melting progresses along an approximately spherical or part-spherical surface having a substantially constant temperature. This surface corresponds to the inner surface of the leading end of the column 2 which bounds the melting cavity. The molten material produced by the action of the arc 5 may flow downwardly to the outlet 7 along the sponge iron particles bounding the melting cavity.

According to the invention, it is further advantageous when the bottom portion 6 of the melting chamber is configurated in correspondence with the isothermal surface formed in the leading end of the column 2, that is, in correspondence with the isothermal progression of melting. Thus, it is particularly favorable for the bottom portion 6 of the melting chamber to be of approximately hemi-spherical configuration and the bottom portion 6 of the melting chamber is here illustrated as having a somewhat trough-like or tub-shaped configuration. On the other hand, the portion of the melting chamber above the bottom portion 6 preferably either has a substantially constant cross-section or widens somewhat in downward direction, that is, is of downwardly and outwardly flaring configuration. The portion of the melting chamber above the bottom portion 6 will normally constitute the major part of the melting chamber.

It will be appreciated that the invention permits charges to be melted under non-oxidizing or reducing conditions by virtue of the fact that an electric arc is used for the melting operation. Furthermore, if it is desired to produce a steel from the charge, the alloying additions required for the final desired steel composition may be admitted into the melting chamber together with the other ingredients and these alloying additions may even, in part, be in the form of oxides.

It will be understood that each of the elements described above, or two or more together, may also find a useful application in other types of melting arrangements differing from the types described above.

While the invention has been illustrated and described as embodied in a melting arrangement for use in the continuous production of steel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspect of this invention.

What is claimed as new and desired to be protected by Letters Patent is set forth in the appended claims:

1. An arrangement for melting charges, comprising wall means defining a substantially vertically oriented melting chamber for accommodating a column of charge, said chamber including an upper region for the introduction of said charge therein and a lower region for melting the leading end of said column; electrode means having an arc-generating end for effecting melting of said leading end; and a support member for said electrode means having an end section which is arranged to be located adjacent said lower region during melting of said leading end, said support member supporting said electrode means in such a manner as to permit an arc from said arc-generating end to melt said leading end while said electrode means is maintained substantially free of contact with said column above said end section of said support member.

2. An arrangement as defined in claim 1 said chamber having a bottom, and said electrode means being effective for producing a melting cavity in said leading end during melting of the latter; and wherein said arc generating end is positioned at such a distance above said bottom that said melting cavity is of approximately spherical or part-spherical configuration.

3. An arrangement as defined in claim 1, wherein said electrode means comprises a plurality of electrodes.

4. An arrangement as defined in claim 1, wherein at least the major part of said chamber is of approximately constant cross-section.

5. An arrangement as defined in claim 1, wherein said electrode means is adapted to be substantially centrally positioned in said chamber.

6. An arrangement as defined in claim 1, wherein said electrode means is effective for generating an arc which extends across the major part of the cross-section of said column.

7. An arrangement as defined in claim 1, wherein said electrode means is effective for superheating the molten material produced by melting of said leading end.

8. An arrangement as defined in claim 1, said chamber having a bottom portion, and said electrode means being effective for melting said leading end in such a manner as to produce in said leading end a melting cavity having a substantially and wherein said bottom portion of said chamber is configurated approximately in correspondence with said isothermal surface.

9. An arrangement as defined in claim 1, wherein said wall means is provided with an opening for the substantially continuous withdrawal of molten material from said chamber during melting of said leading end.

10. An arrangement for melting sponge iron, comprising means defining a substantially vertically oriented melting chamber adapted to accommodate a column of charge, said chamber having a bottom; electrode means for melting the leading end of said column, said electrode means having an arc-generating end adapted to be downwardly directed and located within said column during melting of said leading end so that said electrode means is effective for producing a melting cavity in said leading end during melting of the latter, and said bottom of said chamber being provided with an opening for the substantially continuous withdrawal of molten material from said chamber during melting of said leading end; and a support member for said electrode means adapted to extend through said column and having an end section adapted to be located in the region of said leading end during melting of the latter, said electrode means provided at said end section and said support member maintaining said arc-generating end positioned at such a distance above said bottom of said chamber during melting of said leading end that said melting cavity is of approximately spherical or part-spherical configuration.

11. An arrangement for melting charges, particularly for use in the continuous production of steel from ore, pellets, sinter or the like, comprising means defining a substantially vertically oriented melting chamber adapted to accommodate a column of charge; electrode means for melting the leading end of said column, said electrode means having an arc-generating end adapted to be downwardly directed and located within said column during melting of said leading end; and a support member for said electrode means, said support member being provided with at least one opening for the introduction of reduction gas into said chamber.

12. An arrangement as defined in claim 11, said chamber having a lower region for melting of said leading end and an upper region for direct reduction of said charge; and wherein said one opening is adapted to be located in said upper region.

13. An arrangement for melting charges, particularly for use in the continuous production of steel from ore, pellets, sinter or the like, comprising means defining a substantially vertically oriented melting chamber adapted to accommodate a column of charge, said chamber having an upper region and a lower region; electrode means for melting the leading end of said column in said lower region, said electrode means having an arc-generating end adapted to be downwardly directed and loctated within said column during melting of said leading end; and means for effecting reduction of said charge in said upper region.

14. An arrangement as defined in claim 13, wherein said reducing means comprises a passage in said chamber defining means for admitting at least one stream of reducing gas into said upper region so as to effect direct reduction of said charge.

15. An arrangement as defined in claim 13, and further comprising a supprot member for said electrode means.

16. An arrangement as defined in claim 15, said support member being adapted to extend through said column and having an end section adapted to be located in the region of said leading end during melting of the latter; and wherein said electrode means is provided at said end section.

* * * * *